Nov. 1, 1932.  W. G. TYLER  1,885,493
AUTOMOBILE BABY CRIB
Filed July 3, 1931
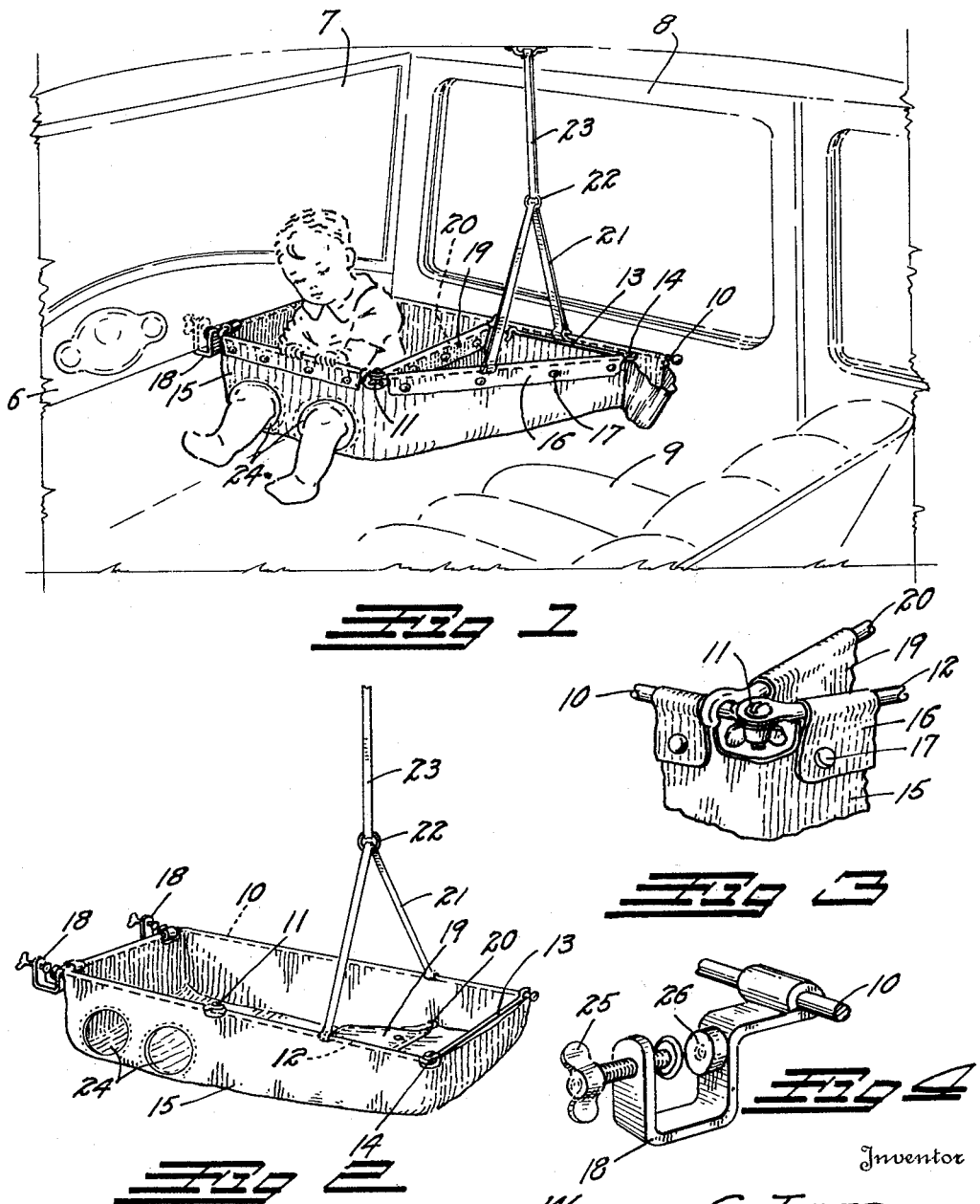

Patented Nov. 1, 1932

1,885,493

UNITED STATES PATENT OFFICE

WILLARD G. TYLER, OF DENVER, COLORADO

AUTOMOBILE BABY CRIB

Application filed July 3, 1931. Serial No. 548,485.

This invention relates to an automobile bed for carrying a baby in an automobile. The principal object of the invention is to provide a bed which can be quickly and easily attached to or detached from the automobile and in which the baby can be safely carried in a sitting position without discomfort to the passengers and which, when desired, can be quickly and easily converted into a full length bed to allow the baby to lie down.

Another object of the invention is to so construct the device that it will not interfere with the use of the automobile doors and so that it will occupy but a minimum of space when not in use.

A further object of the invention is to provide a compartment for carrying toilet requisites, toys, etc.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the invention in use.

Fig. 2 illustrates the invention converted for the lying-down position.

Fig. 3 is a detail view of the hinge employed in the crib frame.

Fig. 4 is a detail view of a type of attachment clamp which may be employed with the device.

In the drawing various parts of an automobile have been indicated by numeral as follows: instrument board 6; windshield 7; right front door 8; and front seat 9. The invention is arranged to be detachably attached to the instrument board 6 and project rearwardly above the front seat 9 immediately inside the right front door 8.

The invention comprises a metallic rod frame 10 bent in a U-shape with one leg considerably longer than the other. The short leg of the frame 10 is hinged as shown at 11, to a swinging side bar 12 which in turn is hinged at its extremity to an end hook member 13 by means of a suitable hinge 14. A canvas carrier 15 is suspended from the frame 10 and the side bar 12. The carrier 15 may be attached by means of suitable flaps 16 and snap fasteners 17 or it may be permanently sewed thereto as shown in Fig. 2. A partition flap 19 is secured across the bottom of the carrier 15, and is arranged to be supported by a removable cross rod 20.

The forward extremity of the frame 10 is supported by means of suitable clamps 18 arranged to be attached to the lower edge of the instrument board of the automobile. The clamps 15 are preferably arranged to rotatably receive the bar of the frame 10 so that the entire frame can be swung upwardly with the clamps serving as hinges.

The clamps 18 may be of any desired construction suitable for attaching to the lower edge of the instrument board 6 and supporting the bed at the desired height. One method of constructing the clamps is illustrated in Fig. 4 in which a clamp screw 25 acts to clamp a rubber pad 26 against the instrument board 6.

The rearward extremity of the device is supported by means of a strap hanger 21 which is secured at one extremity of the frame 10 and at the other extremity to the swing bar 12. The strap 21 may be passed through a suitable slide ring 22 suspended from a suspension strap 23 which in turn is connected in any desired manner with the automobile top.

When it is desired to carry a baby in the sitting position, as illustrated in Fig. 1, the baby's legs are inserted through suitable leg holes 24 in the carrier 15, and the flap 19 is suspended from the cross bar 20 to form a side member. The swinging bar 12 is swung toward the side, as shown in Fig. 1, so that it will be out of the way of the seat occupants and where it will serve to provide a compartment for carrying toys, toilet requisites, etc. When it is desired to allow the baby to lie down the swinging bar 12 is swung outwardly and the hook 13 is engaged over the frame 10 so as to hold the device in the open position of Fig. 2. When in the open position partition flap 19 is lain upon the bottom of the carrier. This provides a full length bed for the baby.

When not in use the entire device can be collapsed and placed under the automobile seats where it will occupy but a minimum of space. The bed can be used for removing the baby from the car without disturbing said baby by simply loosening the hanger 21 and the clamps 18 and then lifting the entire device from the car.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for carrying a child in an automobile comprising: a horizontally positioned U-shaped frame; means for supporting said frame from said automobile, one side of said frame being substantially shorter than the other side thereof; a swinging bar hinged to the shorter side so that it can swing toward and away from the longer side; and a fabric carrier secured at its upper edge along said frame and along said bar.

2. Means for carrying a child in an automobile comprising: a horizontally positioned U-shaped frame; means for supporting said frame from said automobile, one side of said frame being substantially shorter than the other side thereof; a swinging bar hinged to the shorter side so that it can swing toward and away from the longer side; and a fabric carrier secured at its upper edge along said frame and along said bar; means for holding said swinging bar parallel to said long side so as to form a bed when desired.

3. Means for carrying a child in an automobile comprising: a horizontally positioned rod-like frame; means for supporting said frame in said automobile, one side of said frame being shorter than the other side thereof; a swinging bar hinged to the extremity of the shorter side; a fabric carrier secured at its upper edge along said frame and along said bar; and a hook member hinged to the extremity of said bar and arranged to detachably engage the sides of said frame so as to hold said bar in fixed position when desired.

In testimony whereof I affix my signature.

WILLARD G. TYLER.